(12) United States Patent
Tokuda et al.

(10) Patent No.: US 10,994,204 B1
(45) Date of Patent: May 4, 2021

(54) GAME SYSTEM, METHOD FOR CONTROLLING GAME SYSTEM, AND NON-TRANSITORY COMPUTER READABLE MEDIUM

(71) Applicant: CAPCOM CO., LTD., Osaka (JP)

(72) Inventors: Yuya Tokuda, Osaka (JP); Kaname Fujioka, Osaka (JP); Teruki Endo, Osaka (JP); Mitsuru Endo, Osaka (JP); Daiki Hosokawa, Osaka (JP); Hirokazu Tanaka, Osaka (JP); Riki Shigematsu, Osaka (JP)

(73) Assignee: CAPCOM CO., LTD., Osaka (JP)

( * ) Notice: Subject to any disclaimer, the term of this patent is extended or adjusted under 35 U.S.C. 154(b) by 130 days.

(21) Appl. No.: 16/491,912

(22) PCT Filed: Mar. 6, 2018

(86) PCT No.: PCT/JP2018/008593
§ 371 (c)(1),
(2) Date: Sep. 6, 2019

(87) PCT Pub. No.: WO2018/164129
PCT Pub. Date: Sep. 13, 2018

(30) Foreign Application Priority Data

Mar. 9, 2017 (JP) .............................. JP2017-044583

(51) Int. Cl.
*A63F 13/57* (2014.01)
(52) U.S. Cl.
CPC .................................. *A63F 13/57* (2014.09)
(58) Field of Classification Search
CPC ...... A63F 13/57; A63F 13/573; A63F 13/577; A63F 13/55; A63F 13/56; A63F 2300/643; A63F 2300/646

(Continued)

(56) References Cited

U.S. PATENT DOCUMENTS 6,767,286 B1 7/2004 Nagoshi et al.
7,971,157 B2 * 6/2011 Markovic ................ H04N 7/18
715/863

(Continued)

FOREIGN PATENT DOCUMENTS

| JP | 7-8632 A | 1/1995 |
| JP | 2002-52241 A | 2/2002 |
| JP | 2003-103046 A | 4/2003 |
| JP | 2008-99755 A | 5/2008 |

OTHER PUBLICATIONS

Kadokawa Corporation, "EVOLVE" Dengeki PlayStation vol. 585, non-official translation, Feb. 26, 2015, vol. 21, No. 7, pp. 114-119 (in particular, p. 116, left column "Point 2: Tracing and pushing monster").

(Continued)

*Primary Examiner* — Allen Chan
(74) *Attorney, Agent, or Firm* — IP Business Solutions, LLC

(57) ABSTRACT

There are provided a game program and a game system for achieving a game in which, even when it is difficult to determine the location of an enemy character while searching for the enemy character in a virtual game space, it is not too difficult to find the enemy character. A game program 30a causes a CPU 10 to function as a virtual-space generating unit 40, a character control unit 42, a trace generating unit 43 that generates a trace of a non-player character and locates it in the virtual game space, a point managing unit 45 that manages a trace point obtained when a trace located in the virtual game space is collected, and a guidance executing unit 47 that performs the guidance regarding the non-player character to the user when an accumulated value Vs of the trace points reaches a predetermined threshold value.

18 Claims, 5 Drawing Sheets

(58) Field of Classification Search
USPC .......................................................... 463/31
See application file for complete search history.

(56) References Cited

U.S. PATENT DOCUMENTS

| | | | |
|---|---|---|---|
| 2011/0256932 A1* | 10/2011 | Kim | A63F 13/75 463/42 |
| 2014/0121022 A1* | 5/2014 | Shah | A63F 13/23 463/38 |
| 2015/0094127 A1* | 4/2015 | Canose | G06F 3/04842 463/2 |

OTHER PUBLICATIONS

ASCII Media Works Inc., "Fate/EXTRA" Dengeki PlayStation vol. 474, non-official translation, Jun. 25, 2010, vol. 16, No. 22, pp. 98-99 (in particular, p. 9 9, upper column "basis", p. 99, center column "Master war").

Koichi Hamamura, "Monster Hunter Portable 2nd G Official Guidebook", First Edition, Enterbrain Co., Ltd., Aug. 1, 2008, p. 466-p. 469

International Search Report for corresponding International Patent Application No. PCT/JP2018/008593 dated Jun. 5, 2018.

\* cited by examiner

| TRACE | IDENTIFICATION INFORMATION | TRACE POINT | SUBTRACTION METHOD |
|---|---|---|---|
| 「FOOTPRINT」 | NPC01 | 10 p | -1 p/3 m, Min = 3 p |
| 「SLOBBER」 | NPC03 | 8 p | -2 p/5 m, Min = 0 p |
| 「SCRATCH」 | NPC02 | 4 p | — |
| ⋮ | ⋮ | ⋮ | ⋮ |
| ⋮ | ⋮ | ⋮ | ⋮ |

FIG. 3

GAME SYSTEM, METHOD FOR CONTROLLING GAME SYSTEM, AND NON-TRANSITORY COMPUTER READABLE MEDIUM

TECHNICAL FIELD

The present invention relates to a game system for realizing a game set in a virtual game space, a method for controlling the game system, and a non-transitory computer readable medium.

BACKGROUND ART

Conventionally, there is a game in which a player character acts in a virtual game space in accordance with the user's operation (see Non-Patent Document 1). In the game described in Non-Patent Document 1, a quest is prepared for the purpose of defeating a predetermined enemy character (boss character). Further, the virtual game space is divided into multiple areas that are recognizable by the user, and the setting is previously made as to which area the boss character appears.

CITATION LIST

Patent Literature

[Non-Patent Document 1] Edited by Hirokazu Hamamura, "Monster Hunter Portable 2nd G Official Guidebook", First Edition, Enterbrain Corporation, Aug. 1, 2008, P. 466-P. 469

SUMMARY OF THE INVENTION

Problems to be Solved by the Invention

However, in the case of the above-described game, the user remembers the appearance area of the boss character after having repeatedly played the quest and therefore has less fun for searching for the boss character. Conversely, it is considered that the appearance position of the boss character is not fixed. However, some of the recent games are configured such that the virtual game space is wide and seamless. In such a game, when the appearance position of the boss character is not fixed, it may be very difficult for the user to find the boss character by himself.

Furthermore, in some conventional games, footprints of the enemy character are left, and the player character follows them so as to find the enemy character. However, if all of the footprints are drawn when the enemy character moves widely in the vast virtual game space, the processing load of the computer for drawing is high.

Therefore, the object of the present invention is to provide a game system for achieving a game in which, even when it is difficult to determine the location of an enemy character while searching for the enemy character in a virtual game space, it is not too difficult to find the enemy character and in which it is possible to reduce the load for drawing a trace, a method for controlling the game system, and a non-transitory computer readable medium.

Means for Solving the Problems

A game system according to the present invention is a game system including a storage and a control unit, wherein the control unit includes: a virtual-space generating unit that generates a virtual game space; a character control unit that controls action of a player character and a non-player character in the virtual game space; a trace generating unit that generates a trace of the non-player character in accordance with action of the non-player character; a trace locating unit that locates the generated trace in the virtual game space; a point managing unit that manages a trace point obtained when the player character collects the trace located in the virtual game space; and a guidance executing unit that executes guidance regarding the non-player character to a user when an accumulated value of the trace points reaches a predetermined threshold value.

Effect of the Invention

According to the present invention, it is possible to provide a game system for achieving a game in which, even when it is difficult to determine the location of the enemy character while searching for the enemy character in the virtual game space, it is not too difficult to find the enemy character, a method for controlling the game system, and a non-transitory computer readable medium.

BRIEF DESCRIPTION OF THE DRAWINGS

FIG. 3 is a table that illustrates the content of trace data.

DESCRIPTION OF EMBODIMENTS

Figure 1:
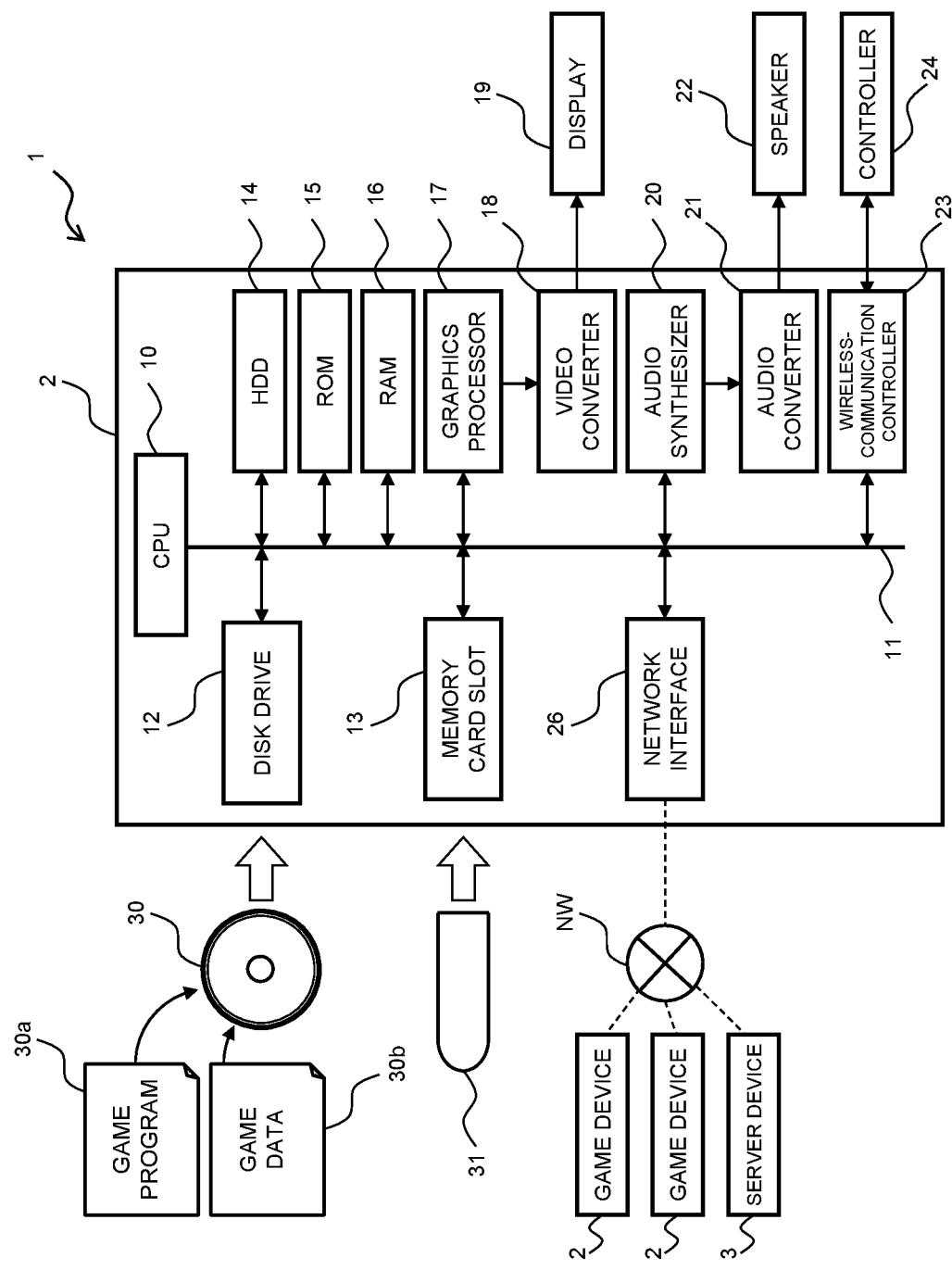
FIG. 1 is a block diagram that illustrates a hardware configuration of a game system.

A game system according to an aspect of the present invention is a game system including a storage and a control unit, wherein the control unit includes: a virtual-space generating unit that generates a virtual game space; a character control unit that controls action of a player character and a non-player character in the virtual game space; a trace generating unit that generates a trace of the non-player character in accordance with action of the non-player character and that locates the generated trace in the virtual game space; a point managing unit that manages a trace point obtained when the player character collects the trace located in the virtual game space; and a guidance executing unit that executes guidance regarding the non-player character to a user when an accumulated value of the trace points reaches a predetermined threshold value.

In this manner, by following the trace of the non-player character, such as an enemy character, the guidance regarding the non-player character is executed. Therefore, it is possible to achieve a game in which the enemy character may be reached by flowing some traces even when, for example, the setting is made such that it is difficult to find the location of the enemy character.

Further, the guidance executing unit may be configured to execute at least one of following: guidance for orienting the player character to a current position of the non-player character, guidance for orienting the player character to a predetermined trace among uncollected traces, and provision of status information on the non-player character.

Thus, it is possible to provide the user with useful information regarding the non-player character, such as the location of the non-player character, the place where an uncollected trace exists, or the status information on the non-player character.

Further, a configuration may be such that multiple threshold values are set for the accumulated value of the trace points and the guidance executing unit executes guidance of different content for each of the threshold values.

Thus, as more traces are collected by the player character himself due to the user's operation, there are more contents and types of guidance for the non-player character, which is advantageous in a battle with the non-player character. Therefore, in the quest in which a battle with the non-player character is a condition for beating, the user easily obtains a sense of accomplishment that he has won by himself.

Further, a configuration may be such that the identification information on a non-player character corresponding to the trace is given to the trace and the point managing unit manages the trace point for each of the non-player characters based on the identification information.

Thus, when multiple non-player characters exist in the virtual game space, the non-player characters for the guide may be different depending on the type of collected trace. Therefore, when the user has the target non-player character, it is possible to efficiently obtain the guidance regarding the non-player character by exclusively collecting traces corresponding to the non-player character.

Further, the control unit may further include an acquired-point subtracting unit that reduces the trace point obtained when the player character collects a trace in accordance with an elapsed time after the trace is located in the virtual game space until the trace is collected.

Thus, by collecting more recent traces, it is possible to quickly obtain guidance regarding the non-player character. Further, even when there are only old traces nearby in a long distance from the non-player character, the guidance regarding the non-player character may be obtained by collecting many traces. Further, as for the trace for which the point becomes zero after a predetermined time has elapsed, it may be deleted from the virtual game space when the point becomes zero. In that case, as it is possible to suppress an increase in the number of the managed traces in the virtual game space, the processing load of the computer may be reduced.

Further, the control unit may further include a guidance restricting unit that restricts execution of guidance regarding the non-player character when the player character is within a predetermined range from the non-player character or the player character is in a combat state.

Thus, for example, when the player character is near the non-player character and the location thereof is already known, unnecessary guidance may be omitted. Alternatively, when the player character is in a combat state with the non-player character even though it is located away to such a degree that the exact location of the non-player character is not determined, it is possible to provide an environment that enables the concentration on the battle by omitting unnecessary guidance.

A method for controlling a game system according to an aspect of the present invention includes: a virtual-space generating step of generating a virtual game space; a character controlling step of controlling action of a player character and a non-player character in the virtual game space; a trace generating step of generating a trace of the non-player character in accordance with action of the non-player character and locating the generated trace in the virtual game space; a point managing step of managing a trace point obtained when the player character collects the trace located in the virtual game space; and a guidance executing step of executing guidance regarding the non-player character to a user when an accumulated value of the trace points reaches a predetermined threshold value.

A non-transitory computer readable medium according to an aspect of the present invention is a non-transitory computer readable medium storing a command executable by a computer and readable by the computer, the command includes: a virtual-space generating step of generating a virtual game space; a character controlling step of controlling action of a player character and a non-player character in the virtual game space; a trace generating step of generating a trace of the non-player character in accordance with action of the non-player character and locating the generated trace in the virtual game space; a point managing step of managing a trace point obtained when the player character collects the trace located in the virtual game space; and a guidance executing step of executing guidance regarding the non-player character to a user when an accumulated value of the trace points reaches a predetermined threshold value.

An explanation is given below of a game system according to an embodiment of the present invention, a method for controlling the game system, and a non-transitory computer readable medium with reference to the drawings. An action game executed by a home-use game device is described below as an example. The action game according to the present embodiment is progressed when the user operates the player character in the virtual game space so as to beat a predetermined quest such as, for example, defeating an enemy character that is a non-player character.

(Hardware Configuration)

FIG. 1 is a block diagram that illustrates a hardware configuration of a game system 1. The game system 1 includes a game device 2 and a server device 3. The game device 2 is capable of communicating with the other game devices 2 and the server device 3 via a communication network NW, such as the Internet or a LAN. The game device 2 includes a CPU 10 that is a computer for controlling the operation thereof, and a disk drive 12, a memory card slot 13, an HDD 14 and a ROM 15 forming a storage, and a RAM 16 are connected to the CPU 10 via a bus 11.

A disc-type recording medium 30, which is a non-transitory computer readable medium such as DVD-ROM, is loadable in the disk drive 12. A game program 30a and game data 30b according to the present embodiment are recorded on the disc-type recording medium 30. The game data 30b includes various types of data necessary for the progress of the game, such as the data necessary to form each character and a virtual game space and the sound data to be reproduced during the game. Further, a card-type recording medium 31 is loadable into the memory card slot 13 so that the save data indicating the play status, such as the progress of the game, is recordable in response to a command from the CPU 10.

The HDD 14 is a large-capacity storage that is built in the game device 2 and that has the game program 30a and the game data 30b read from the disc-type recording medium 30, the save data, and the like, recorded therein. The ROM 15 is a semiconductor memory, such as mask ROM or PROM, in which the startup program for starting up the game device 2, the program for controlling an operation when the disc-type recording medium 30 is loaded, and the like, are recorded. The RAM 16 is formed of a DRAM, SRAM, or the like, and it reads the game program 30a to be executed by the CPU 10, the game data 30b necessary for the execution thereof, and the like, from the disc-type recording medium 30 or the HDD 14 in accordance with the play status of the game and temporarily records them.

Furthermore, a graphics processor 17, an audio synthesizer 20, a wireless-communication controller 23, and a network interface 26 are connected to the CPU 10 via the bus 11.

The graphics processor 17 draws a game image including a virtual game space, each character, and the like, in response to a command from the CPU 10. Specifically, the position, the direction, the zoom factor (the angle of view), and the like, of the virtual camera set in the virtual game space are adjusted, and the virtual game space is captured. Then, a rendering process is performed on the captured image, and a two-dimensional game image for display is generated. Moreover, an external display (display unit) 19 is connected to the graphics processor 17 via a video converter 18. The game image drawn by the graphics processor 17 is converted into a moving image format by the video converter 18 and is displayed on the display 19.

The audio synthesizer 20 reproduces and synthesizes the digital-format sound data included in the game data 30b in accordance with a command from the CPU 10. Further, an external speaker 22 is connected to the audio synthesizer 20 via an audio converter 21. Thus, the sound data reproduced and synthesized by the audio synthesizer 20 is decoded into an analog form by the audio converter 21 and is output from the speaker 22 to the outside.

The wireless-communication controller 23 has a wireless communication module in 2.4 GHz band and is wirelessly connected to a controller 24 attached to the game device 2 so as to transmit and receive data. The user is capable of inputting a signal to the game device 2 by operating an operating unit 25, such as a button, provided in the controller 24 and it is capable of controlling the action of a player character displayed on the display 19.

The network interface 26 connects the game device 2 to the communication network NW, such as the Internet or a LAN, and enables the communication with the other game devices 2 and the server device 3. Furthermore, the game device 2 is connected to the other game devices 2 via the communication network NW to transmit and receive data to and from each other, whereby multiple player characters are displayable in synchronization in the identical game space. Thus, a multiplayer game is achieved, in which multiple players make the game progress in cooperation.

(Functional Configuration of Game Device)

Figure 2:
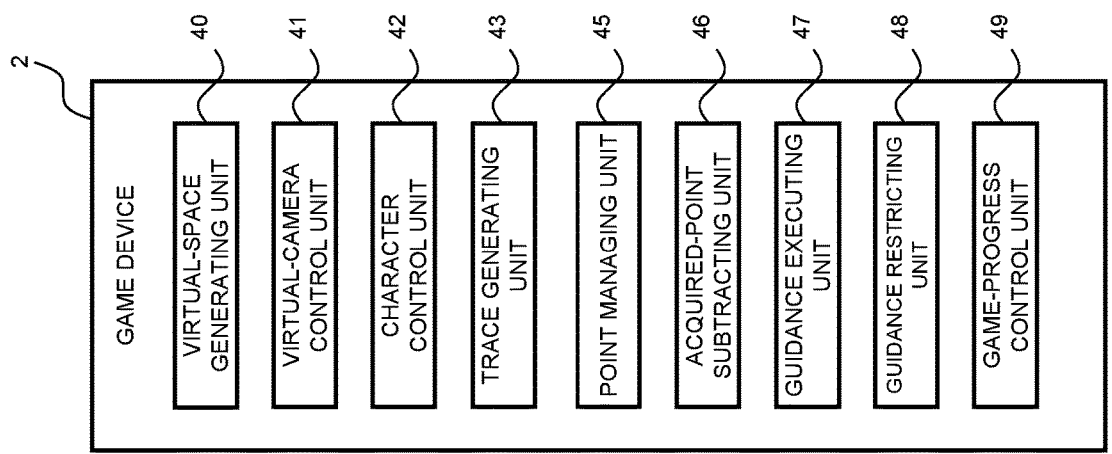
FIG. 2 is a block diagram that illustrates a functional configuration of a game device.

FIG. 2 is a block diagram that illustrates a functional configuration of the game device 2 provided in the game system 1. The game device 2 executes the game program 30a according to the present invention to function as a virtual-space generating unit (virtual-space generating means) 40, a virtual-camera control unit (virtual-camera controlling means) 41, and a character control unit (character controlling means) 42, a trace generating unit (trace generating means) 43, a point managing unit (point managing means) 45, an acquired-point subtracting unit (acquired-point subtracting means) 46, a guidance executing unit (guidance executing means) 47, a guidance restricting unit (guidance restricting means) 48, and a game-progress control unit (game-progress controlling means) 49. Moreover, each of these functions is formed by, as hardware, the CPU 10, the HDD 14, the ROM 15, the RAM 16, the graphics processor 17, the video converter 18, the audio synthesizer 20, the audio converter 21, the wireless-communication controller 23, and the like, illustrated in FIG. 1.

The virtual-space generating unit 40 generates a three-dimensional virtual game space which is a stage where a player character acts. For example, the virtual-space generating unit 40 determines the position and the texture of an object, determines the setting of a light source, and determines the setting of an effect, such as fog or fire sparks, after the elapse of one frame in accordance with the frame rate, thereby generating a virtual game space.

The virtual-camera control unit 41 controls the virtual camera that captures the virtual game space. For example, the virtual-camera control unit 41 determines the location of the virtual camera with respect to a player character (such as the location in the first-person viewpoint or the third-person viewpoint). Then, the virtual-camera control unit 41 controls the capturing posture, the zoom factor, and the like, of the virtual camera in accordance with the operation on the controller 24 by the user. Further, when the user operates the controller 24 to move the player character, the virtual-camera control unit 41 moves the virtual camera so as to follow it.

The character control unit 42 controls the actions of a player character and a non-player character in the virtual game space in accordance with the operation on the controller 24 by the user. For example, the non-player character is controlled to perform various biological actions in accordance with the in-game time, the environment in the virtual game space, the status of the non-player character itself, or the like. Specifically, the non-player character is caused to perform actions, such as moving in the virtual game space, slobbering, or scratching a tree to damage it.

Furthermore, the character control unit 42 switches the status of the non-player character depending on whether the player character and the non-player character are in a combat state or in a non-combat state. For example, the character control unit 42 switches the status of the non-player character from the non-combat state to the combat state when the player character attacks the non-player character or the player character enters a predetermined range from the non-player character.

The character control unit 42 controls the non-player character in the combat state so as to, for example, actively perform the action of following and attacking the player character. Further, the non-player character in the combat state is switched to the non-combat state when there are no attacks from the player character and the state where the player character is away from the non-player character by more than a predetermined distance continues for a predetermined time period.

The trace generating unit 43 generates the trace of the non-player character by using, for example, an object in accordance with the action of the non-player character. Furthermore, the trace generating unit 43 locates the generated trace in a place where the non-player character exists in the virtual game space. The trace includes "footprint" on the ground where the non-player character has walked, "slobber" dripping from the non-player character's mouth, "scratch" when the non-player character has scratched a tree with a nail, and the like. The trace generating unit 43 appropriately generates these traces in accordance with the action of the non-player character and further locates them at appropriate positions in the virtual game space. Moreover, the trace generating unit 43 may be set to generate a trace each time a predetermined time has elapsed. The provided trace is displayed within the virtual game space so that the user may visually distinguish it.

Furthermore, the non-player characters of this game include: an enemy character (boss character) that is to be fought against and defeated by the player character as the condition for beating the quest; and an enemy character (normal character) that is not included as the condition for beating the quest. In each quest of this game, one or more enemy characters including at least the boss character generate traces. However, the character generating the trace is not limited to the above. It may be a predetermined enemy character not including the boss character or may be a non-player character other than the enemy character.

The point managing unit 45 manages a trace point obtained when the player character collects (acquires) a trace located in the virtual game space.

FIG. 3 is a table that illustrates an example of the content of data (trace data) regarding traces. The trace data is included in the game data 30b. As illustrated in FIG. 3, a trace point is set to each trace and, in the trace data, the types of traces are associated with points.

Furthermore, the player character is capable of collecting the trace when the user performs a predetermined operation on the controller 24 while the player character is within a predetermined range from the trace in the virtual game space. Alternatively, the trace may be collected without performing a predetermined operation such that the trace is automatically collected when the player character simply comes close to the predetermined range from the trace. When the trace is collected in this manner, the point managing unit 45 refers to the trace data, acquires the trace point corresponding to the trace collected by the user, and stores it in the RAM 16. Moreover, the point managing unit 45 calculates (updates) the accumulated value of the trace points acquired so far or resets the accumulated value as appropriate.

Furthermore, each trace is provided with the identification information on the enemy character corresponding to the trace. More specifically, as illustrated in FIG. 3, the trace data on each trace includes the identification information (NPC01, NPC02, NPC03, or the like) with which the type of enemy character having left the trace may be identified. Further, the point managing unit 45 manages the trace point acquired by the player character so as to calculate the accumulated value for each type of enemy character.

The acquired-point subtracting unit 46 reduces the trace point obtained when the player character collects a trace in accordance with the elapsed time from when the trace is located in the virtual game space until it is collected. The way of reducing trace points may be set as appropriate. For example, the trace point may be set by subtracting a predetermined point from the initial value of the trace points each time the predetermined time has elapsed. Further, the finally obtained trace point may be zero accordingly, or the minimum value larger than zero, from which a point is not further subtracted, may be set. Moreover, only a part of traces may be the target for subtraction, and the traces may include a trace whose trace point is not subtracted even when a time period has elapsed.

In the example illustrated in FIG. 3, the settings are made for the trace of "footprint" such that one point is subtracted each time three minutes have elapsed but the points are prevented from being less than three points. The settings are made for the trace of "slobber" such that two points are subtracted each time five minutes have elapsed and the points finally become zero points. Further, the setting is made for the trace of "scratch" such that the trace point is not subtracted even when the time period has elapsed. Moreover, the trace having finally zero points may be deleted from the virtual game space.

The guidance executing unit 47 executes guidance regarding the non-player character to the user when the accumulated value of the trace points reaches a predetermined threshold value. Here, in this game, multiple threshold values are set, and the guidance executing unit 47 executes guidance of the contents that are different for each of the threshold values.

More specifically, in this game, three threshold values Th1, Th2, and Th3 are set in the ascending order of numerical values. Further, the guidance executing unit 47 performs guidance of, for example, "trace navigation", "NPC navigation", and "status disclosure" to the user each time the accumulated value of the trace points of a certain enemy character reaches each threshold value.

Among them, in the "trace navigation", the display 19 presents a guidance display for orienting the player character to a predetermined trace which is a trace left by a certain enemy character and which has not been collected at present. Although the "predetermined trace" is optionally settable, it may be, for example, one trace that is, among the traces that have not been collected with regard to the enemy character, the oldest trace among the traces that are generated after the newest trace collected with regard to the enemy character.

Further, in the "NPC navigation", the display 19 presents a guidance display for directly orienting the player character to the current position of a certain enemy character. In the "status disclosure", the display 19 presents the information about the current state (the current position, the health, the attack power, the defense power, or the like) of a certain enemy character. However, the content of each guidance is not limited to the one described above. For example, in the "NPC navigation", instead of that described above or in addition to that described above, the display 19 may present a map indicating the current position or the direction of an enemy character or may present a map indicating the movement route or the movement destination of an enemy character.

Furthermore, in this game, the guidance executing unit 47 exclusively executes the "trace navigation" when the accumulated value of the trace points is equal to or more than Th1 and less than Th2 and exclusively executes the "NPC navigation" when the accumulated value is equal to or more than Th2 and less than Th3. On the other hand, when the accumulated value is equal to or more than Th3, the guidance executing unit 47 selectively executes either the "NPC navigation" or the "status disclosure" in accordance with the user's operation on the controller 24.

The guidance restricting unit 48 restricts the guidance regarding the non-player character when a predetermined condition is satisfied even though the accumulated value of the trace points has reached the predetermined threshold value. Specifically, when the player character is within a predetermined range from the non-player character or when the player character is in a combat state, the guidance restricting unit 48 restricts the execution of guidance regarding the non-player character.

The game-progress control unit 49 controls the progress of the game in accordance with the user's operation on the controller 24, the elapse of the in-game time, and the like. For example, the game-progress control unit 49 generates a predetermined event when the player character performs a predetermined action due to the user's operation. Further, the game-progress control unit 49 changes the environment in the virtual game space as the in-game time elapses. Moreover, the game-progress control unit 49 causes an enemy character to appear in various places in the virtual game space depending on, for example, the place where the player character is.

(Flow of Game)

Figure 4:
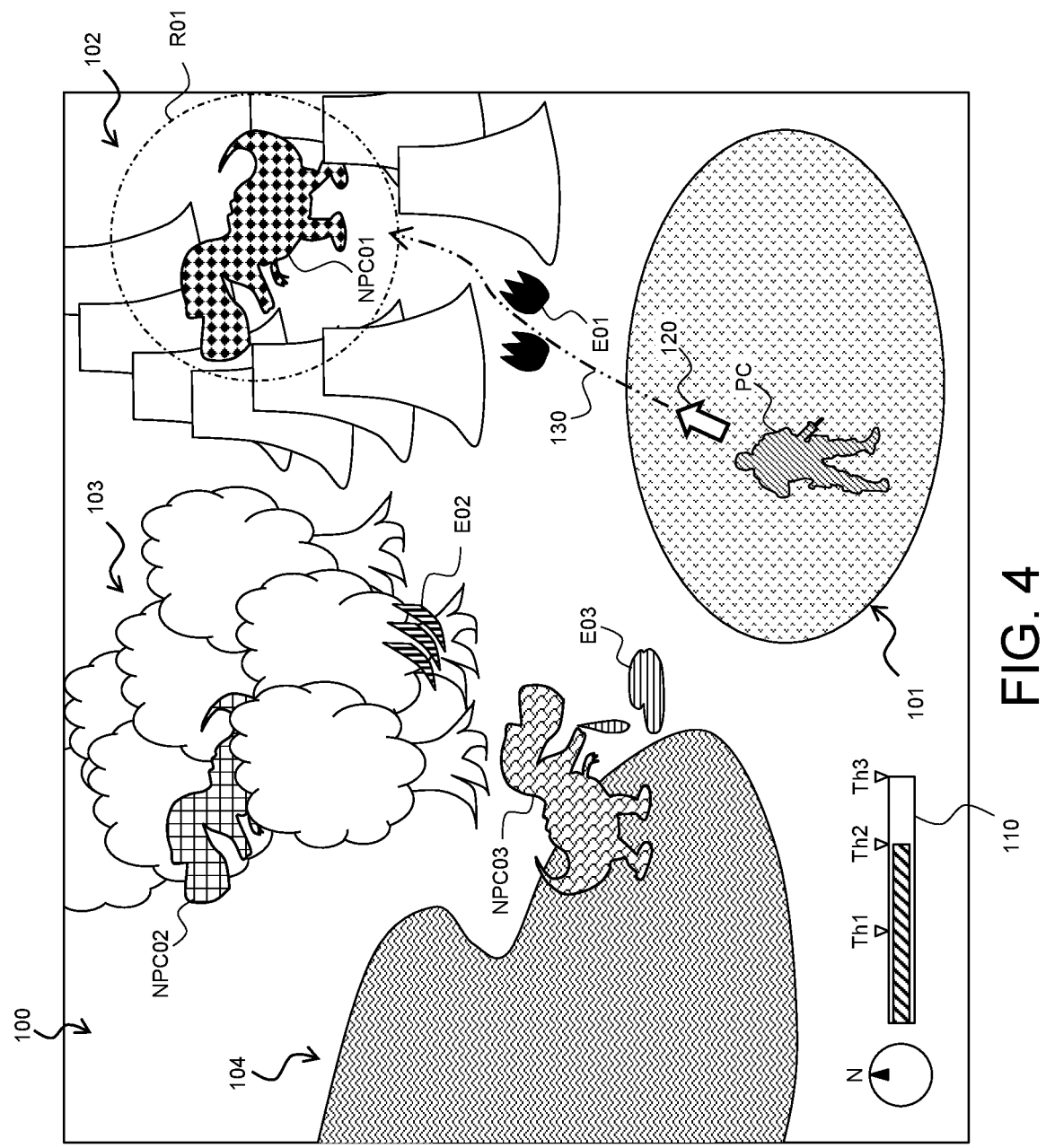
FIG. 4 is a schematic plan view that illustrates a situation in a virtual game space.
Figure 5:
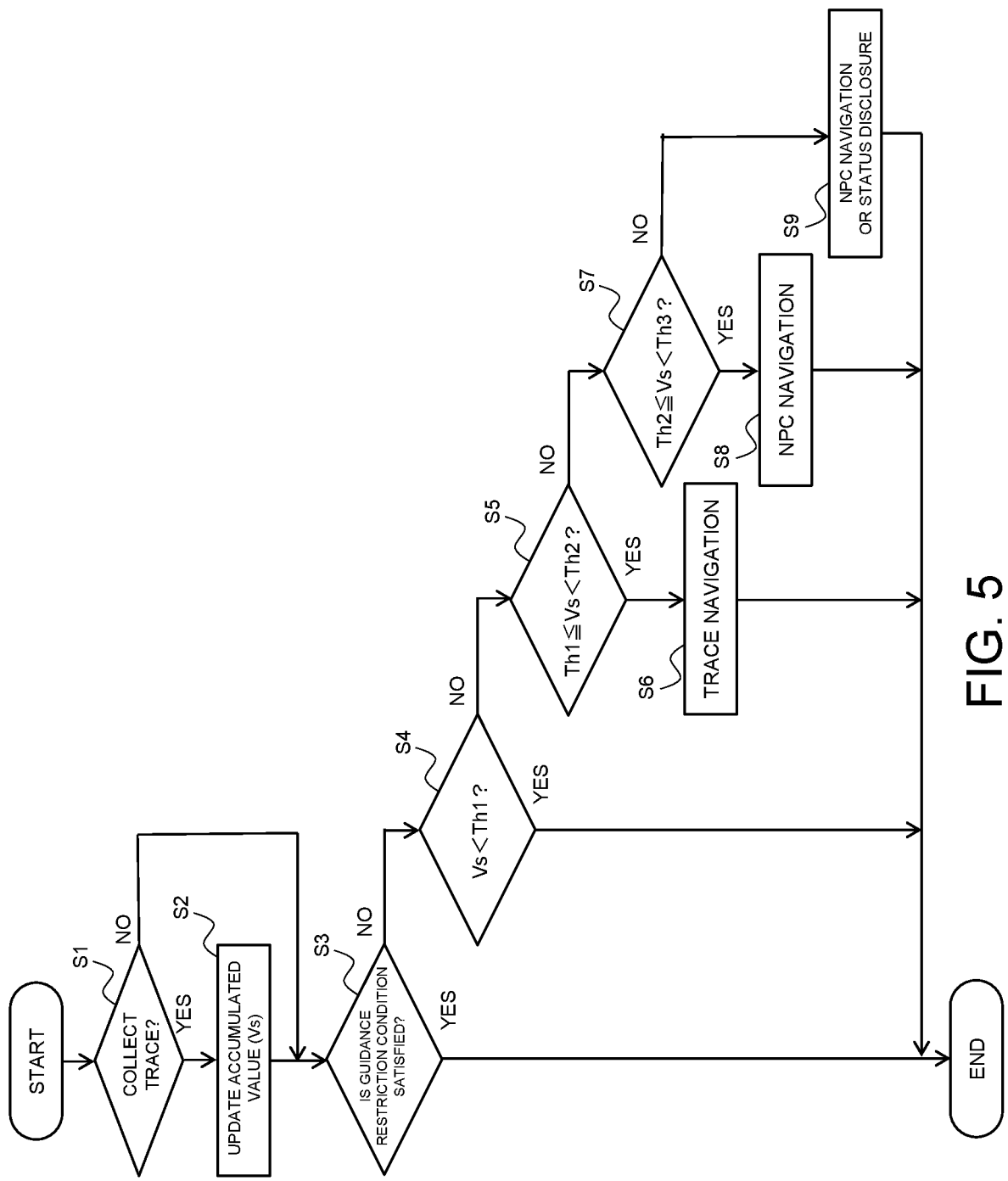
FIG. 5 is a flowchart that illustrates an operation of the game system.

FIG. 4 is a schematic plan view that illustrates a situation in the virtual game space when the guidance regarding an enemy character is obtained by collecting a trace left by the enemy character. FIG. 5 is a flowchart that illustrates an operation (control method) of the game system 1. The series of processes illustrated in FIG. 5 are repeatedly executed at a predetermined cycle (for example, the same cycle as the frame rate).

A virtual game space 100 illustrated in FIG. 4 is formed to be seamless and has multiple areas. For example, the virtual game space 100 includes a plain area 101 on the south side where a player character PC is currently located, a mountain area 102 on the east side, a forest area 103 on the north side, and a lake area 104 on the west side. Further, at present, the enemy character NPC01 lives in the mountain area 102, the enemy character NPC02 lives in the forest area 103, and the enemy character NPC03 lives in the lake area 104.

Further, traces of the enemy characters NPC01 to NPC03 are left in the virtual game space 100. For example, a footprint E01 of the enemy character NPC01, a scratch E02 obtained when the enemy character NPC02 scratched a tree, slobber E03 of the enemy character NPC03, and the like, are left. That is, in the virtual game space 100, at least the three enemy characters NPC01 to NPC03 exist as non-player characters for which a trace is to be generated.

In such a situation, the user operates the controller 24 to make the game progress. Here, it is assumed that the user is playing a quest under such a condition for beating, that the enemy character NPC01 is to be defeated. Therefore, the user has to move the player character PC so as to search for the enemy character NPC01; however, as the virtual game space 100 is vast, it is difficult to find the enemy character NPC01 by simply walking around. However, in this game, the user is capable of reaching the location of the enemy character NPC01, which is the target to be searched for, by collecting a trace of the enemy character NPC01 and obtaining the guidance regarding the enemy character NPC01.

The search procedure is specifically described. First, the user sets the enemy character NPC01 among the enemy characters NPC01 to NPC03 as a non-player character to be searched for on a setting screen, which is not illustrated. Then, the user causes the player character PC to move in the virtual game space 100 to collect a trace (Step S1).

For example, when the player character PC moves in the virtual game space 100 to find a trace E01 left by the enemy character NPC01, a predetermined operation is performed on the controller 24 in the vicinity thereof. Thus, the character control unit 42 causes the player character PC to perform the action to pick up the trace E01. As a result, the user acquires the trace E01.

Furthermore, the point managing unit 45 makes an inquiry of the acquired trace E01 with the trace data and acquires the identification information on the trace E01, a trace point, and the like. Then, the point managing unit 45 updates an accumulated value Vs by adding the currently acquired trace point to the accumulated value Vs of the trace points stored in the RAM 16 for each type of enemy character (Step S2). Further, the accumulated value Vs of the trace points regarding the enemy character NPC01, which is the target to be searched for, is displayed as an indicator 110 in the form of a bar graph, for example, at an appropriate position on the display 19.

Furthermore, when the user already knows the location of the enemy character NPC01, there is little significance in executing the guidance, and there is a possibility that the guidance display is obtrusive if the guidance is executed. Therefore, in this game, the execution of guidance is restricted regardless of the accumulated value Vs of the trace points in such a case. Therefore, the guidance restricting unit 48 determines whether the condition for restricting the guidance regarding the enemy character NPC01 is satisfied (Step S3).

This guidance restriction condition is as described above and, specifically speaking about the enemy character NPC01, two settings are made; (1) when the player character PC is within a predetermined range R01 from the enemy character NPC01, and (2) when the player character PC is in a combat state even though the player character PC is out of the predetermined range R01 from the enemy character NPC01. Then, the guidance restricting unit 48 determines that the guidance restriction condition is satisfied when at least one of the two conditions is satisfied (Step S3: YES).

When it is determined that the guidance restriction condition is satisfied (Step S3: YES), the guidance restricting unit 48 does not perform the guidance regarding the enemy character NPC01, and the current process illustrated in FIG. 5 ends. On the other hand, when the guidance restricting unit 48 determines that the guidance restriction condition is not satisfied (Step S3: NO), the game device 2 performs the process corresponding to the accumulated value Vs of the trace points of the enemy character NPC01.

First, the game device 2 determines whether the current accumulated value Vs is less than the threshold value Th1 (Step S4). When the accumulated value Vs is less than the threshold value Th1 (Step S4: YES), the guidance executing unit 47 does not execute the guidance regarding the enemy character NPC01, and the current process illustrated in FIG. 5 ends. When the accumulated value Vs is equal to or more than the threshold value Th1 (Step S4: NO), the game device 2 then determines whether the accumulated value Vs is less than the threshold value Th2 (Step S5). As a result, when the accumulated value Vs is equal to or more than the threshold value Th1 and less than the threshold value Th2 (Step S5: YES), the guidance executing unit 47 executes the above-described "trace navigation" (Step S6).

Conversely, when the accumulated value Vs is equal to or more than the threshold value Th2 (Step S5: NO), the game device 2 then determines whether the accumulated value Vs is less than the threshold value Th3 (Step S7). As a result, when the accumulated value Vs is equal to or more than the threshold value Th2 and less than the threshold value Th3 (Step S7: YES), the guidance executing unit 47 executes the "NPC navigation" instead of the "trace navigation" (Step S8). Furthermore, when the accumulated value Vs is equal to or more than the threshold value Th3 (Step S7: NO), the guidance executing unit 47 executes any one of the "NPC navigation" and the "status disclosure" selected by the user's operation (Step S9).

As described above, in this game, by collecting a trace of the enemy character that is the target to be searched for, it is possible to obtain the guidance regarding the enemy character. As a result, even in a game where the enemy character appears at any location in the seamless and vast virtual game space, it is possible to relatively easily reach the location of the enemy character.

Further, when the player character PC reaches the predetermined range R01 from the enemy character NPC01 as a result of the navigation, the navigation is stopped as a state is obtained such that the guidance restriction condition at Step S3 is satisfied. Conversely, when a state is then obtained such that the guidance restriction condition is not satisfied (Step S3: NO) even though it is determined that the guidance restriction condition is once satisfied (Step S3: YES), the guidance executing unit 47 executes the guidance (Steps S6, S8, S9) corresponding to the accumulated value Vs at that time.

Furthermore, the guidance display in the trace navigation and the NPC navigation may be realized by indicating the guidance direction illustrated in FIG. 4 with an arrow-shaped object 120. However, the medium for guidance is not limited to the arrow-shaped object. For example, a dedicated non-player character (guidance character) acting in the virtual game space 100 may be prepared as a guidance medium so that, when the navigation is executed, the guidance character acts as a guide. Further, in the virtual game space 100, the guidance direction may be represented by forming a fluid by a cluster of particles and slowly moving the fluid in the guidance direction.

When the guidance medium is a non-player character or a cluster of particles, these guidance media may be set so as not to be too far from the player character PC. Specifically, the moving range of the guidance medium may be limited to the range from the player character PC by a predetermined distance.

Furthermore, the navigation may be performed by using a known route search algorithm. For example, a navigation mesh formed of a polygon mesh is formed in the virtual game space 100 for the movement of a non-player character, and a route 130 (see the two-dot chain line in FIG. 4) to the enemy character NPC01 at present is searched for by using an algorithm, such as A-star, with the intersection point of the mesh as a node. Then, the player character PC is guided to follow the route 130.

By the way, as for the trace appearing in this game, the trace point obtained at the time of collection changes (decreases) in accordance with the elapsed time from when it is located in the virtual game space 100 until when it is collected by the player character PC (see "the subtraction method" in FIG. 3). Further, the trace located in the virtual game space 100 may be represented so as to gradually fade away (the appearance degrades) in accordance with the elapse of the time. This allows the user to estimate, based on the state of the found trace, whether the enemy character having left the trace is still nearby or has already gone far. Further, by collecting a newer trace, it is possible to reach the location of the enemy character earlier.

Furthermore, the trace points may be subtracted in accordance with the degradation in the appearance of the trace. Alternatively, the trace points may be constant (not subtracted) while the appearance of the trace is degraded and, conversely, the appearance of the trace may be unchanged although the trace points are subtracted. Further, in the example illustrated in FIG. 3, the way of subtracting trace points is different depending on the type of trace (subtraction for "slobber" is quicker than for "footprint"); however, instead of it or in addition to it, it may be different depending on the type of enemy character having left a trace. For example, the subtraction of trace points may take a longer time for an enemy character (the boss character than the normal character) having a higher degree of influence on the progress of the game.

Furthermore, the type of trace located in the virtual game space may be determined in accordance with the shape of the land where an enemy character is present. For example, it is possible to leave a footprint when the enemy character exists on the sandy land, leave a claw mark when in the forest, and leave an uneaten bone when in the grass field where there is a grass-eating animal that serves as prey.

Furthermore, when multiple users play this game (multi-player game), the trace points acquired by the player characters operated by the respective users may be added together to calculate the accumulated value (Vs), or they may be managed for each player character without being added.

Furthermore, according to the present embodiment, the enemy character, which is the target to be searched for, is limited to one, but two or more enemy characters may be simultaneously set as search targets. Further, for the enemy character that is not set as the search target, the guidance executing unit 47 does not perform any guidance even when the trace points regarding the enemy character reach any of the threshold values Th1 to Th3.

INDUSTRIAL APPLICABILITY

The present invention is applicable to a game system, a method for controlling the game system, and a non-transitory computer readable medium for executing a game set in a virtual game space.

DESCRIPTION OF REFERENCE NUMERALS

1: Game system
2: Game device
10: CPU (computer)
30a: Game program
30b: Game data
40: Virtual-space generating unit
42: Character control unit
43: Trace generating unit 45: Point managing unit 46: Acquired-point subtracting unit
47: Guidance executing unit
48: Guidance restricting unit

The invention claimed is:

1. A game system comprising a storage and a control unit, wherein
the control unit includes:
a virtual-space generating unit generating a virtual game space;
a character control unit controlling action of a player character and a non-player character in the virtual game space;
a trace generating unit generating a trace of the non-player character in accordance with action of the non-player character and locate the generated trace in the virtual game space;
a point managing unit managing a trace point obtained when the player character collects the trace located in the virtual game space; and
a guidance executing unit executing guidance regarding the non-player character to a user when an accumulated value of the trace points reaches a predetermined threshold value.

2. The game system according to claim 1, wherein the guidance executing unit executes at least one of following: guidance for orienting the player character to a current position of the non-player character, guidance for orienting the player character to a predetermined trace among uncollected traces, and provision of status information on the non-player character.

3. The game system according to claim 1, wherein multiple threshold values are set for the accumulated value of the trace points, and the guidance executing unit executes guidance of different content for each of the threshold values.

4. The game system according to claim 1, wherein
identification information on a non-player character corresponding to the trace is given to the trace, and
the point managing unit manages the trace point for each of the non-player characters based on the identification information.

5. The game system according to claim 1, wherein the control unit further includes an acquired-point subtracting unit reducing the trace point obtained when the player character collects a trace in accordance with an elapsed time after the trace is located in the virtual game space until the trace is collected.

6. The game system according to claim 1, wherein the control unit further includes a guidance restricting unit restricting execution of guidance regarding the non-player character when the player character is within a predetermined range from the non-player character or the player character is in a combat state.

7. A method for controlling a game system comprising:
a virtual-space generating step of generating a virtual game space;
a character controlling step of controlling action of a player character and a non-player character in the virtual game space;
a trace generating step of generating a trace of the non-player character in accordance with action of the non-player character and locating the generated trace in the virtual game space;
a point managing step of managing a trace point obtained when the player character collects the trace located in the virtual game space; and
a guidance executing step of executing guidance regarding the non-player character to a user when an accumulated value of the trace points reaches a predetermined threshold value.

8. The method for controlling the game system according to claim 7, wherein the guidance executing step executes at least one of following: guidance for orienting the player character to a current position of the non-player character, guidance for orienting the player character to a predetermined trace among uncollected traces, and provision of status information on the non-player character.

9. The method for controlling the game system according to claim 7, wherein multiple threshold values are set for the accumulated value of the trace points, and the guidance executing step executes guidance of different content for each of the threshold values.

10. The method for controlling the game system according to claim 7, wherein
identification information on a non-player character corresponding to the trace is given to the trace, and
the point managing step manages the trace point for each of the non-player characters based on the identification information.

11. The method for controlling the game system according to claim 7, further comprising an acquired-point subtracting step of reducing the trace point obtained when the player character collects a trace in accordance with an elapsed time after the trace is located in the virtual game space until the trace is collected.

12. The method for controlling the game system according to claim 7, further comprising a guidance restricting step of restricting execution of guidance regarding the non-player character when the player character is within a predetermined range from the non-player character or the player character is in a combat state.

13. A non-transitory computer readable medium storing a command executable by a computer, the command includes:
a virtual-space generating step of generating a virtual game space;
a character controlling step of controlling action of a player character and a non-player character in the virtual game space;
a trace generating step of generating a trace of the non-player character in accordance with action of the non-player character and locating the generated trace in the virtual game space;
a point managing step of managing a trace point obtained when the player character collects the trace located in the virtual game space; and
a guidance executing step of executing guidance regarding the non-player character to a user when an accumulated value of the trace points reaches a predetermined threshold value.

14. The non-transitory computer readable medium according to claim 13, wherein the guidance executing step executes at least one of following: guidance for orienting the player character to a current position of the non-player character, guidance for orienting the player character to a predetermined trace among uncollected traces, and provision of status information on the non-player character.

15. The non-transitory computer readable medium according to claim 13, wherein multiple threshold values are set for the accumulated value of the trace points, and the guidance executing step executes guidance of different content for each of the threshold values.

16. The non-transitory computer readable medium according to claim 13, wherein
identification information on a non-player character corresponding to the trace is given to the trace, and
the point managing step manages the trace point for each of the non-player characters based on the identification information.

17. The non-transitory computer readable medium according to claim 13, further comprising an acquired-point subtracting step of reducing the trace point obtained when the player character collects a trace in accordance with an elapsed time after the trace is located in the virtual game space until the trace is collected.

18. The non-transitory computer readable medium according to claim 13, further comprising a guidance restricting step of restricting execution of guidance regarding the non-player character when the player character is within a predetermined range from the non-player character or the player character is in a combat state.

* * * * *